(12) United States Patent
Pappas et al.

(10) Patent No.: US 8,154,258 B2
(45) Date of Patent: Apr. 10, 2012

(54) BACKUP ENERGY STORAGE MODULE WITH VOLTAGE LEVELING

(75) Inventors: Alexander N. Pappas, Westford, MA (US); Kendrick Barry A. Williams, Duxbury, MA (US); Aaron L. Cianelli, Methuen, MA (US)

(73) Assignee: Oracle America, Inc., Redwood City, CA (US)

( * ) Notice: Subject to any disclaimer, the term of this patent is extended or adjusted under 35 U.S.C. 154(b) by 698 days.

(21) Appl. No.: 12/249,595

(22) Filed: Oct. 10, 2008

(65) Prior Publication Data

US 2010/0090663 A1   Apr. 15, 2010

(51) Int. Cl.
*H02J 7/00* (2006.01)
(52) U.S. Cl. .................................. 320/166; 320/167
(58) Field of Classification Search ............... 320/108, 320/166, 167
See application file for complete search history.

(56) References Cited

U.S. PATENT DOCUMENTS

| | | | | |
|---|---|---|---|---|
| 6,014,049 A | * | 1/2000 | Bach et al. | 327/170 |
| 6,614,708 B1 | * | 9/2003 | Lin et al. | 365/228 |
| 2004/0207361 A1 | * | 10/2004 | Utsunomiya et al. | 320/103 |
| 2007/0139018 A1 | * | 6/2007 | Mentelos | 320/166 |
| 2007/0273335 A1 | * | 11/2007 | Duff | 320/166 |
| 2009/0233170 A1 | | 9/2009 | Iacovangelo et al. | |
| 2009/0251007 A1 | | 10/2009 | Adams et al. | |
| 2009/0261782 A1 | | 10/2009 | Morita | |

* cited by examiner

*Primary Examiner* — Arun Williams
(74) *Attorney, Agent, or Firm* — Meyertons, Hood, Kivlin, Kowert & Goetzel, P.C.

(57) ABSTRACT

An energy storage module for providing backup power to electronic systems includes one or more capacitor banks, each including one or more capacitors for storing energy. The energy storage module also includes a first voltage regulator that may, during a normal mode of operation, provide a regulated direct current (DC) voltage to charge the one or more capacitors of each capacitor bank. In addition, each of the capacitor banks may include a voltage leveling circuit that may maintain a specific voltage on the capacitors. Further, the energy storage module includes an output circuit that may, during a backup mode of operation, provide an output voltage derived from an output of each of the one or more capacitor banks. The output circuit includes a control unit configured to regulate and combine the output of each of the one or more capacitor banks.

16 Claims, 8 Drawing Sheets

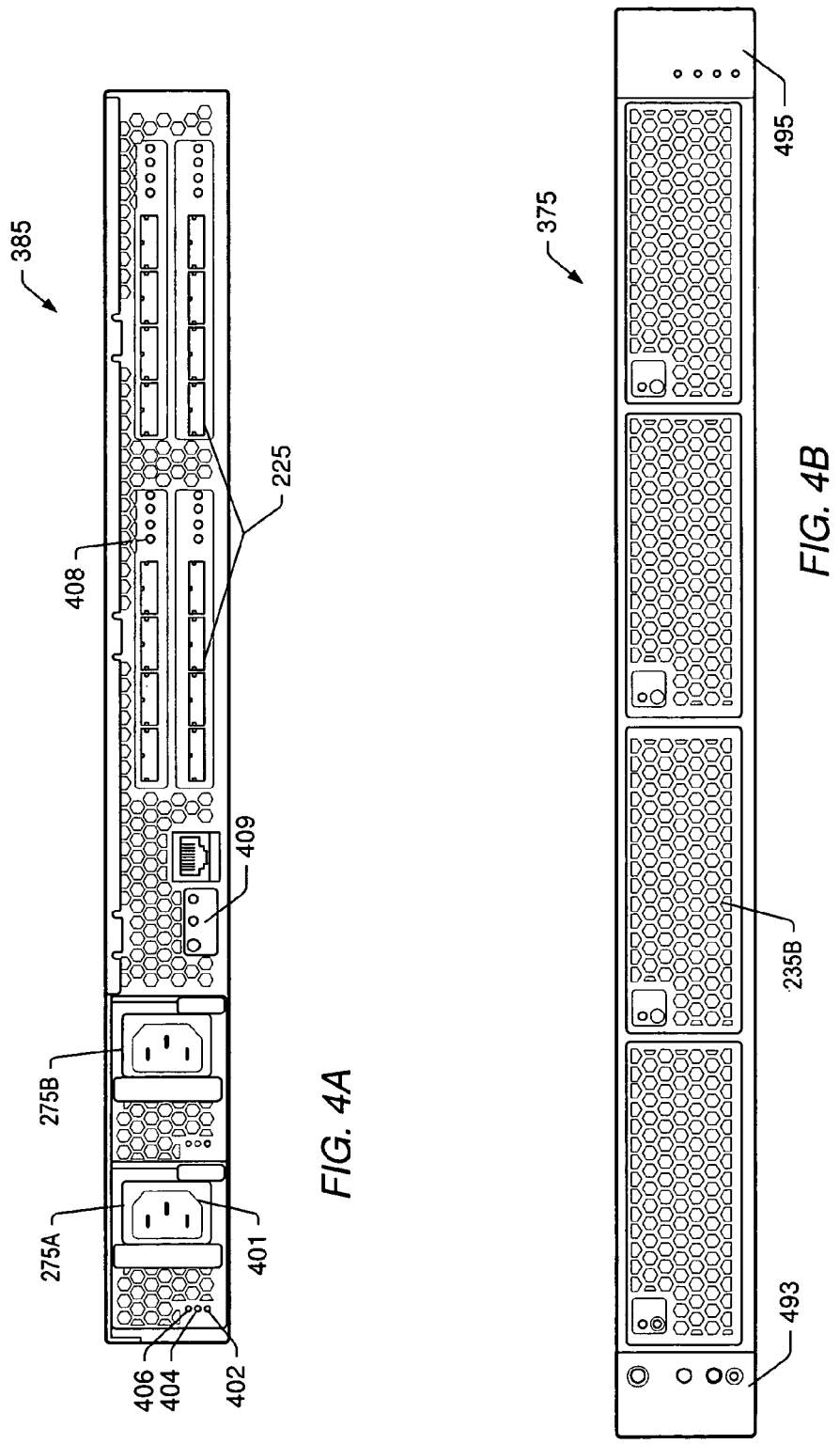

BACKUP ENERGY STORAGE MODULE WITH VOLTAGE LEVELING

BACKGROUND OF THE INVENTION

1. Field of the Invention

This invention relates to computer system storage devices and, more particularly, to solid state storage systems.

2. Description of the Related Art

In the electronics industry, the trend is to make electronic equipment smaller as each generation hits the market. As the electronic equipment and its associated equipment racks get smaller, backup power requirements get increasingly difficult to meet. For example, as equipment fits into smaller enclosures, the power supplies that fit in them must also necessarily get smaller. Accordingly, as the power supply units get smaller the ability to provide adequate backup power from a smaller backup supply is more difficult.

SUMMARY

Various embodiments of an energy storage module are disclosed. In one embodiment, the energy storage module includes one or more capacitor banks, each including one or more capacitors, such as supercapacitors for example, for storing energy. The energy storage module also includes a first voltage regulator coupled to the one or more capacitor banks that may, during a normal mode of operation, provide a regulated direct current (DC) voltage to charge the one or more capacitors of each of the capacitor banks. In addition, each of the one or more capacitor banks may include a voltage leveling circuit that may include a passive leveling portion having a plurality of bleed resistors and an active leveling portion having a second voltage regulator circuit. The leveling circuit may maintain a specific voltage on each of the capacitors. Further, the energy storage module includes an output circuit coupled to each of the one or more capacitor banks and configured to, during a backup mode of operation, provide an output voltage derived from an output of each of the one or more capacitor banks. The output circuit includes a control unit that may regulate and combine the output of each of the one or more capacitor banks.

BRIEF DESCRIPTION OF THE DRAWINGS

FIG. 4A is a diagram of one embodiment of a rear panel of the storage subsystem of FIG. 3A.

FIG. 4B is a diagram of one embodiment of a front panel of the storage subsystem of FIG. 3A.

Figure 1:
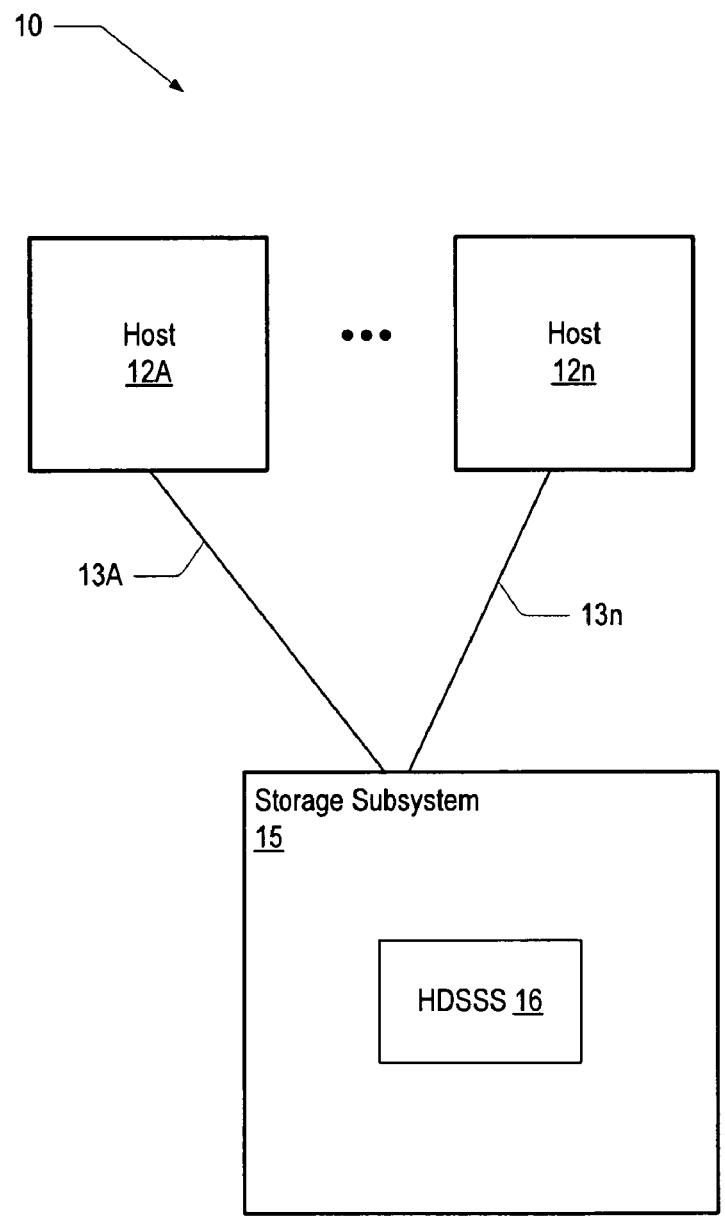
FIG. 1 is a block diagram of one embodiment of a storage server system including a high density solid state storage subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Turning now to FIG. 1, a block diagram of one embodiment of a storage server system including a high-density solid-state storage subsystem is shown. The storage system 10 includes a host 12A coupled to a storage subsystem 15 via a communication link 13A. In addition, host 12n is also coupled to the storage subsystem 15 via communication link 13n, where 'n' may be any number. It is noted that components including a reference designator having a number and a letter may be referred to by the number only where appropriate. For example, when referring generally to any host unit, the host unit may simply be referred to as host 12.

In the illustrated embodiment, the storage subsystem 15 includes a high-density solid-state storage unit 16, designated as HDSSS 16. As described in greater detail below, in one embodiment, HDSSS unit 16 may be implemented using one or more interface devices (not shown in FIG. 1) and a number of memory modules such as, for example, a dual in-line memory module (DIMM), or the like. Each of the modules may include a number of memory devices in the flash memory family such as not-AND (NAND) flash devices, for example. In one specific implementation, the storage subsystem 15 may provide terabytes of storage capacity in a one rack unit (1U) sized enclosure.

In one embodiment, as described further below in conjunction with the description of FIG. 2 and FIG. 3A, the storage subsystem 15 may also include redundant primary power supplies, fan units, system status and environmental monitors, and back-up power for use during a loss of primary AC power and/or in the unlikely event of failure of both power supplies.

In one embodiment, the host units 12A and 12n may be representative of any of a variety of host storage servers. As such, each may include one or more processing units, local memory, and input/output (I/O) ports (not shown). In addition, each host 12 may execute application software and operating system instances that control the configuration, storage and retrieval of information from the storage subsystem 15. More particularly, host unit 12 may execute software to configure the storage subsystem 15 to have redundant array of inexpensive disks (RAID) functionality, and/or zoning functionality, for example. However, as described in greater detail below, due to the interface circuit functionality within HDSSS 15, the actual storage type (i.e., whether actual disk drives or solid state) may be transparent to the host unit 12. Accordingly, the memory modules may represent just a bunch of disk (JBOD) storage to the host 12. Thus, a host unit 12 need not have information that storage subsystem 15 is a high-density solid-state storage system.

In one embodiment, the storage subsystem 15 may be hardware configurable into one or more domains, such that a given domain may include independently accessible storage, and failover capability, and each domain may be isolated from failures in another domain. For example, as described further below in conjunction with the description of FIG. 2, depending on how, via cabling, the host units 12 are coupled to the storage subsystem 15, and the I/O ports of the storage subsystem 15 are connected together, the storage subsystem 15 may be configured into one or more independently accessible domains. In one embodiment, the communication links 13 may be representative of serial attached SCSI (SAS) links.

Figure 2:
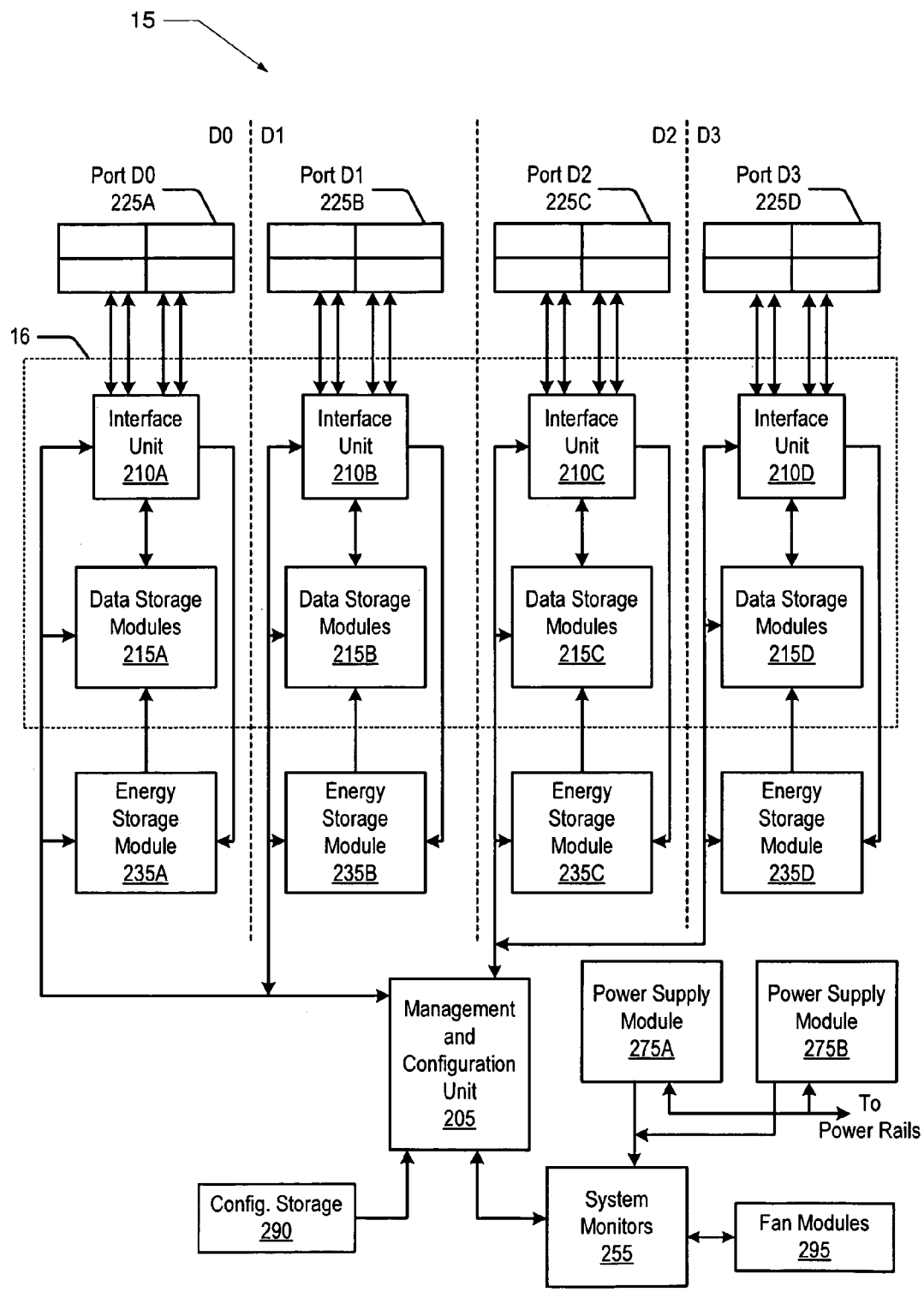
FIG. 2 is a block diagram of one embodiment of the storage subsystem of FIG. 1.

Referring to FIG. 2, a block diagram of one embodiment of the storage subsystem 15 of FIG. 1 is shown. Storage subsystem 15 includes a management and configuration unit 205 that is coupled to four interface units designated 210A through 210D. Each of the interface units 210 is coupled to a respective data storage modules block designated 215A through 215D, and to a respective communication port designated 225A through 225D. As noted above, the HDSSS unit 16 may comprise the interface units 15 and the data storage modules 215. In addition, in the illustrated embodiment, the storage subsystem 15 includes four energy storage modules designated 235A through 235D, each coupled to a respective data storage modules 215 block. The storage subsystem 15 also includes power supply modules 275A and 275B which are coupled to provide primary direct current (DC) power to the power rails of the storage subsystem 15. A system monitor unit 255 is coupled to monitor various system parameters including system status and faults, power supply voltages, enclosure temperatures, fan module status, etc, and to provide indications of these parameters to the management unit 205 via buses such as Inter-Integrated Circuit (I2C) buses, for example. It is noted that although shown as one device, in various embodiments, the system monitor unit 255 may be implemented as a number of discreet monitoring devices. The storage subsystem 15 further includes one or more fan modules 295 and a configuration storage unit 290. As mentioned above and denoted by the dashed lines, the storage subsystem 15 may be configured to operate with a number of domains. In the illustrated embodiment four domains are shown and designated D0 through D3, although in other embodiments the system may be configured into other numbers of domains. As described further below, the hardware interconnection of the ports 225 via cabling may dictate how many domains are in use and which host has access to which domain.

In one embodiment, the management unit 205 may be implemented as a field programmable gate array (FPGA) device having specific functionality. This functionality may be programmed either via an external interface, or alternatively based upon configuration settings stored within configuration storage 290. However, it is noted that management unit 205 may also be implemented as an application specific integrated circuit (ASIC), or a programmable microcontroller in other embodiments. The management unit 205 may be configured to arbitrate between environmental monitor buses, and to provide environmental information to the interface units 210. In addition, as describe further below management unit 205 may share monitoring and control functions with one of the interface units that has been designated as a "master." More particularly, in one embodiment, management unit 205 may handle a majority of the system control and component LEDs, as well as all power control, while the master interface unit 210 may be configured to handle port and domain control and monitoring and reporting tasks for devices such as power supplies 275, any thermal sensors (not shown), fan modules 295, and data storage modules 215. In one embodiment, the management unit 205 may virtualize all of the I2C physical device addresses so that the interface units 210 will only have a single address to access for each device. In one embodiment, the management unit 205 may include a number of status and control registers (not shown) that may control operation of various devices, provide status information to the interface units 210, and to operate various status LEDs.

It is noted that as mentioned above and described further below, each of data storage modules blocks 215 may include a number of memory modules. In one particular embodiment, there may be as many as 80 DIMMs installed in the storage subsystem 15 and organized into the four domains. Accordingly, in such an embodiment each of the data storage module blocks 215 may represent 20 DIMMs. However, it is noted that in various other embodiments any number of DIMMs may be used. As described in further detail below in conjunction with the description of FIG. 3B, each DIMM may include non-volatile memory such as FLASH memory devices, for example, as well as volatile memory, which may serve as an on-DIMM cache.

In one embodiment, each of the interface units 210 may be implemented as an SAS expander device. Accordingly, each may include a microcontroller or other processing functionality to provide SCSI enclosure services (SES) for onboard devices as well as the expander configuration. In one embodiment, external SRAM, FLASH and serial EEPROM devices, for example, (not shown) may be used for code execution space and storage for configuration information and firmware.

As described above, in one embodiment, each of the four interface units 210 may provide four, x4 SAS communication ports 225 that may be used to connect hosts such as hosts 12 of FIG. 1 to the storage domains in the storage subsystem 15, to cascade additional storage subsystems, or to merge physical SAS domains within the storage subsystem 15. By definition, the storage subsystem 15 is shown with four physical SAS domains. However, as mentioned above there are a number of ways to configure the storage subsystem 15 by physically connecting the hosts 12 to the ports 225, and how the ports 225 themselves are interconnected via cabling. The following configurations are provided as examples of how the storage subsystem 15 may be configured. These are representative examples only. In various embodiments, the hosts may be configured as single or dual host bus adapter (HBA) hosts and the storage subsystem 15 may be configured as a single, dual, or quad domain storage subsystem. Furthermore, in embodiments that include 80 DIMMs, a single domain may be configured to have 20, 40, 60, or all 80 DIMMs. Similarly in a dual domain configuration, one domain may include 20, 40, or 60 DIMMs, and the other domain may include the remaining DIMMs. Thus, the storage subsystem 15 is quite flexible. Accordingly, a single host may have access to a single domain configured to have 20, 40, 60, or 80 DIMMs, or two hosts may share any of those configurations. Alternatively, one host may have access to a domain with 20, 40 or 60 DIMMs, while a second host may have access to a second domain having the remaining DIMMs. In another configuration two hosts may share a domain having 40 DIMMs, and a third host may have access to a domain including the remaining 40 DIMMs. There are many other possibilities.

As mentioned above, during system initialization, the management unit 205 may designate one of the interface units 210 as a master, setting for example, a specific bit within a control register of that interface unit 210. After initialization is complete, the management unit 205 may hand over control of certain tasks such as communication and domaining, etc. to the master interface unit 210.

Figure 3A:
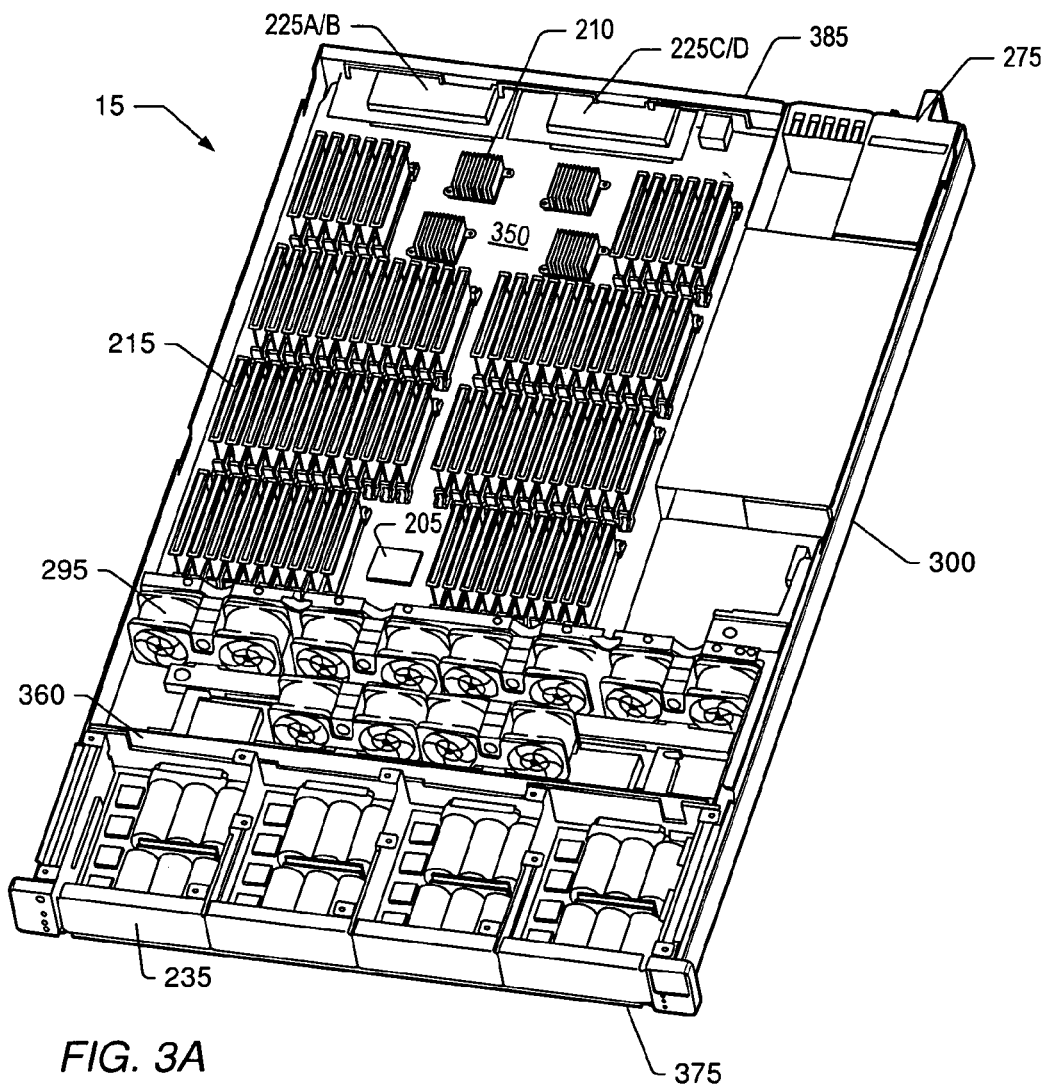
FIG. 3A is a perspective view diagram of one embodiment of the storage subsystem of FIG. 1 and FIG. 2.
Figure 3B:
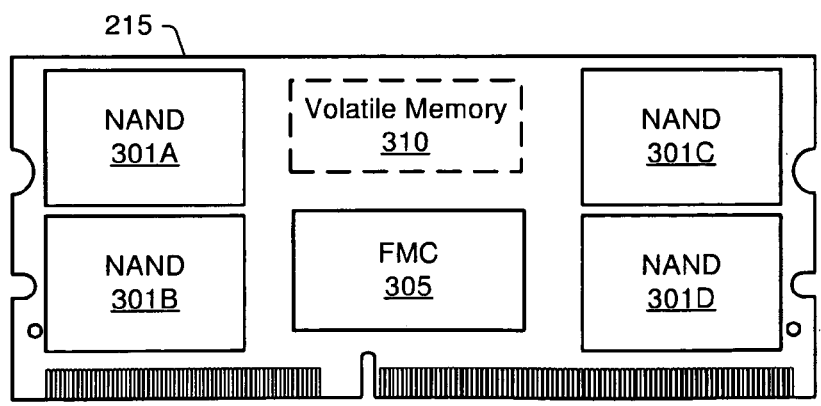
FIG. 3B is a diagram of one embodiment of a data storage module of FIG. 3A.

As shown in FIG. 2, FIG. 3A and FIG. 3B, there are multiple power supplies. For example, there are two alternating current (AC) to direct current (DC) power supply modules (e.g., 275A and 275B) that supply the primary DC power to the power rails. In addition, there are four energy storage modules (e.g., 235A-235D), which may serve as backup power for the storage subsystem 15 in the event that both power supply modules 275 fail, or AC power is lost to both power supply modules 275, and thus the primary DC power is lost on the power rails. In one embodiment, the energy storage modules 235 may be configured to provide backup power for a long enough duration to enable the data storage modules 215 to write any unwritten data to the non-volatile memory on each DIMM.

In one embodiment, the energy storage modules 235 include a number of storage devices such as super capacitors (not shown in FIG. 2) which may hold a substantial electrical charge. As will be described in greater detail below, during system operation, the super capacitors may be kept in a charged state. If a power failure occurs such that the power supplies 275 can no longer provide the primary DC power to the data storage modules 215, in one embodiment the management unit 205 notifies the interface units 210 of the failure, and then causes the energy storage modules 235 to begin powering the data storage modules 215 and any other circuits necessary for a controlled power down. In addition, the management unit 205 may provide a signal to the data storage modules 215 cause the data storage modules 215 to write any unwritten data from the volatile storage to the non-volatile storage on each DIMM. In addition, the interface circuits 210 may notify the hosts 12 of the power down condition. In other embodiments, the management unit 205 may notify the interface circuits 215 and the interface circuits 215 may provide a signal to the data storage modules 215 that may cause the data storage modules 215 to write any unwritten data from the volatile storage to the non-volatile storage on each DIMM. A more detailed description of the power control and failover is given below in conjunction with the description of FIG. 5 through FIG. 6B.

Turning to FIG. 3A, a top-down perspective view drawing of one embodiment of the storage subsystem 15 of FIG. 1 and FIG. 2 is shown. The storage subsystem 15 is shown housed in a single enclosure. In one embodiment, the enclosure is a one rack unit (1U) enclosure. As a 1U enclosure, the enclosure may be 1.75 inches tall and 19 inches wide. As shown, the enclosure has the top cover removed to expose the various internal components. More particularly, beginning at the top of the drawing, the rear panel 385 includes the port connectors for ports 225, as well as various LEDs (examples of which are shown in FIG. 4A). Near the top center, the interface units 210A-210D are mounted to a motherboard 350 and are shown with heat sinks. In addition, the data storage modules 215 are detachably mated to sockets mounted on the motherboard 350. In addition, in the center of the enclosure, the management unit 205 is mounted to the motherboard 350. The top right quadrant of the enclosure houses the power supply units 275. As shown, only one power supply 275 is installed. The middle lower section of the enclosure houses the fan modules 295, which extend across the entire enclosure. The lower section of the enclosure houses the energy storage modules 235. The front panel 375 of the enclosure is formed by the front facings of the energy storage modules 235. From the above description, it is evident that the storage subsystem 15 is a self-contained storage subsystem that can provide data storage capabilities comparable to that of an entire rack full of a conventional hard disk storage units.

Referring to FIG. 3B, a diagram of one embodiment of a data storage module of FIG. 3A is shown. More particularly, in the illustrated embodiment, only one side of the data storage module 215 is shown. The data storage module 215 is implemented as a DIMM that includes non-volatile NAND flash storage devices 301A through 301D, a memory controller 305, and a volatile memory storage unit 310. As denoted by the dotted lines, the volatile memory storage unit 310 may be located on the other side of the data storage module 215.

In one embodiment, the memory controller 305 may be configured to receive storage commands from the interface units 210, and to provide addressing and control signaling to the NAND flash storage devices 301. In addition, the memory controller 305 may also provide data storage module status information to the interface units 210.

In one embodiment, the memory storage unit 310 may be implemented using any of a variety of random access memory (RAM) devices such as for example, devices in the static RAM family or devices in the dynamic RAM (DRAM) family. The volatile memory storage unit 310 may serve as a cache storage for the DIMM. Such that when a write to the data storage module 215 occurs, the data may not be immediately written to the flash memory devices depending upon what transactions are currently occurring. At a subsequent time, the data in the volatile memory storage unit 310 may be written to the flash storage devices 301. As described in greater detail below, in the event of a power failure in which the system DC power is lost, the data storage module 215 may receive a flush signal from the management unit 205, or alternatively from the interface units 210, which causes the memory controller 305 to immediately flush all unwritten data from the volatile memory storage unit 310 to the flash storage devices 301 within some predetermined amount of time to avoid a loss of data.

Turning to FIG. 4A, a diagram illustrating one embodiment of a rear panel of the storage subsystem enclosure of FIG. 3A is shown. Beginning at the left, the rear panel 385 includes two power supply modules (e.g., 275A and 275B). As shown each power supply module includes an AC power plug connector 401. In addition, the rear panel includes a number of LED status indicators. In one embodiment, LED 402, may indicate the AC power status, LED 404 may indicate a power fault condition, and LED 406 may indicate DC power status. The rear panel also includes SIS summary status LEDs 409 that include a push button/LED, and two status LEDs. The status LEDs 409 may indicate whether a fault exists and system status, and the pushbutton LED is a locate button and locate LED. The rear panel further includes four SAS ports (e.g., 225), and each port has four connectors. In addition, each SAS port includes four link status LEDs 408 that may indicate whether the respective link is on or off, link activity, a link fault, and the like. In one embodiment, the power supply modules 275 are each hot pluggable in the event they need to be replaced while the system is in operation.

Referring to FIG. 4B a diagram of one embodiment of a front panel of the storage subsystem enclosure of FIG. 3A is shown. The front panel 375 is comprised of the front panels of the energy storage modules 235. In addition, there are a number of status LEDs 493 and 495. In the illustrated embodiment, the LEDs 493 are located on the left side of the front panel and include a pushbutton LED, a power button and fault and status LEDs. In the illustrated embodiment, the LEDs 495 are located on the right side of the front panel and may indicate a temperature fault, whether a rear access component has a fault, and whether a top side fan has a fault.

Figure 5:
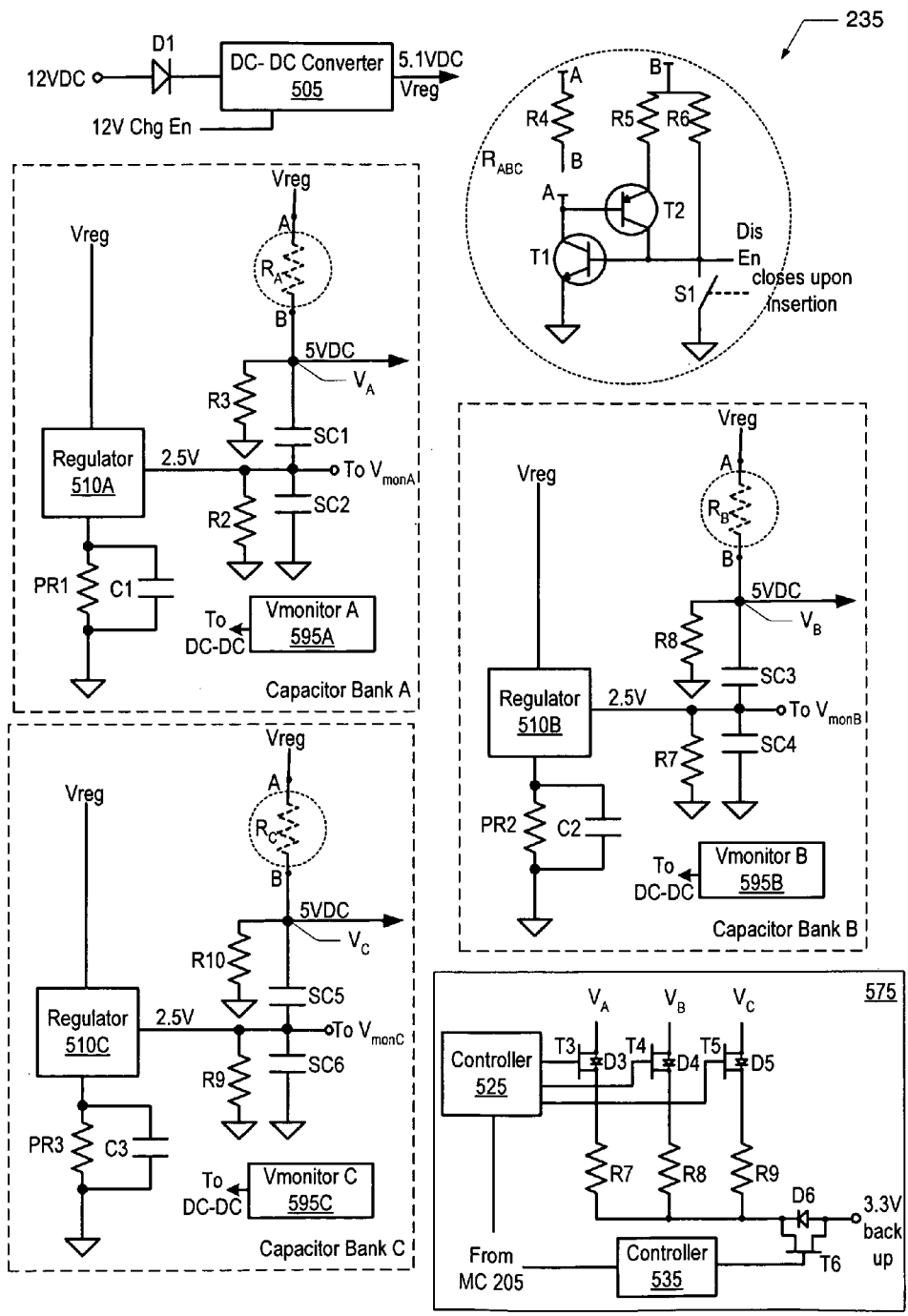
FIG. 5 is a circuit diagram of one embodiment of an energy storage module of the storage subsystem of FIG. 1 through FIG. 3A, and FIG. 4B.

Turning to FIG. 5, a circuit diagram of one embodiment of an energy storage module of the storage subsystem of FIG. 2, FIG. 3A, and FIG. 4B is shown. The energy storage module 235 includes a DC-DC converter 505 that receives 12 VDC through diode D1 from the power supply units 275 of FIG. 2 and FIG. 3A. The output of the converter 505 is approximately 5.1-5.2 VDC, and designated as Vreg. The DC-DC converter 505 is configured to be enabled and disabled by a charge enable signal, designated chg en in FIG. 5. In the illustrated embodiment, Vreg is provided to three capacitor banks designated bank A, bank B, and bank C. The output of each capacitor bank is provided to an Or-ing circuit 575 which combines the currents of the capacitor banks and provides a 3.3 VDC backup voltage for use during loss of the primary 12 VDC, or AC power. Accordingly, in one embodiment when AC power is lost or if both power supplies 275 fail, the energy storage module 235 may provide 3.3 VDC backup power for a predetermined duration, as determined by the management unit 205. It is noted that although the above embodiments include power supplies 275 that provide 12 VDC, and also 3.3 VDC as the primary DC power, it is contemplated that in other embodiments, other supply voltages may be used.

It is noted that in one embodiment, either power supply unit 275 may power the entire storage subsystem 15 by itself. Accordingly, if one power supply unit 275 fails, the storage subsystem 15 will failover to the other operable power supply 275. Thus, since each power supply unit 275 may provide redundant backup for the other power supply unit 275, together the two units provide 1+1 redundancy.

Each of the capacitor banks includes a series coupled pair of supercapacitors, a resistor circuit, a capacitor voltage leveling circuit and a voltage monitor unit. For discussion purposes, capacitor bank A will be described in detail. However, it is noted that capacitor banks B and C operate similarly. It is additionally noted that although the present embodiment includes two series coupled supercapacitors, and three capacitor banks, it is contemplated that in other embodiments, other numbers of capacitors and banks, and other supercapacitor configurations may be used. It is further noted that as shown in FIG. 2 and FIG. 3A there are four energy storage modules 235 in one embodiment of the storage subsystem 15, although other numbers of energy storage modules are possible and contemplated.

In the illustrated embodiment, capacitor bank A includes a pair of series connected supercapacitors designated SC1 and SC2. SC1 is coupled to Vreg via resistor circuit RA and SC2 is coupled to circuit ground. The node between the supercapacitors is coupled to a voltage regulator 510A, to circuit ground through a passive leveling resistor R2, and to the voltage monitor unit, designated Vmonitor unit 595A. The node between resistor circuit RA and supercapacitor SC1 is coupled to circuit ground through a passive leveling resistor R3. The voltage regulator 510A is also coupled to circuit ground through a setpoint resistor PR1 and a capacitor C1, which is coupled in parallel with PR1.

In one embodiment, the supercapacitors, which are also known as electric double-layer capacitors, electrochemical double-layer capacitors, or ultracapacitors, may have a very high energy density compared to regular capacitors. More particularly, for a given sized electrolytic capacitor, the storage capacity may be measured in microfarads (uf), where a similarly sized supercapacitor could have farads of storage capacity. As the alternative names imply, supercapacitors may have an electrical double layer of dielectric material. This double layer may be very thin (e.g., nanometers), but have a very large surface area. One of the drawbacks to the use of supercapacitors is their low operating voltages (e.g., 2-3V), and the possibly undesirable results and equipment damage if the operating voltage is exceeded.

Accordingly, to maintain a particular voltage on each supercapacitor, voltage regulator 510A may be used to actively "level" or maintain 2.5V at the node between supercapacitors SC1 and SC2, while leveling resistor R3 and leveling resistor R2 may be used to passively maintain 2.5V on supercapacitors SC1 and SC2. Accordingly, the combination of active and passive leveling of the voltage on supercapacitors SC1 and SC2 may provide a more comprehensive leveling mechanism than either passive or active leveling when either is used alone.

As mentioned above, the leveling circuit is used to maintain a particular voltage on each supercapacitor to avoid an overvoltage on the supercapacitors. In the illustrated embodiment, resistor R3 may bleed excess voltage on SC1 to circuit ground, and resistor R2 may bleed excess voltage on SC2 to circuit ground. If the voltage drops below a predetermined threshold, as determined by resistor PR1, the regulator 510A provides voltage to boost the voltage backup to 2.5, and so the proper values of R3, R2 and PR1 should be selected to keep the voltage as close to 2.5V as possible. However, as with many circuits there may be overshoot when the regulator 510A begins to ramp the voltage. As described further below, this overshoot may be controlled by appropriate selection of the size of capacitor C1.

In one embodiment regulator 510A may be implemented using a linear regulator such as an LT3080 by Linear Technology, for example. A control input to the regulator controls the output voltage by varying the size of setpoint resistor PR1. However, in the illustrated embodiment capacitor C1, in contrast to the regulator 510A technical data sheet, is not used as a bypass capacitor for filtering noise. Indeed, upon experimentation, a capacitance value has been chosen that is well outside the recommendation of the manufacturer of the regulator 510A, such that capacitor C1 functions instead as a slew rate control in conjunction with resistor R2, to control the overshoot of the regulator 510A. For example, the manufacturer's specification sheet specifies using a small (e.g., 2.2 pf) capacitor as a bypass capacitor to bypass shot noise of the setpoint resistor PR1, and reference current noise. However, if a much larger (e.g., 300 uf-400 uf) capacitor is used, the operation of the regulator 510A changes in an undocumented way. The time constant established by C1 and R2 determines the amount of overshoot (i.e., the reaction time) of the regulator 510A when the voltage at the node between the supercapacitors SC1 and SC2 drops below 2.5V.

Since the energy storage module 235 may provide a significant current when charged, the energy storage module 235 should be discharged upon removal from the storage subsystem 15. Accordingly, as shown in the exploded view, resistor circuits RA, RB, and RC include what is sometimes referred to as a "binistor" circuit. Thus, the resistor circuit RA, in addition to a providing a charging path through resistor R4, resistor circuit RA also includes a discharging circuit that may discharge the supercapacitors to circuit ground when the energy storage module is removed from the storage subsystem 15.

As shown, the discharging circuit includes resistors R5 and R6 and transistors T1 and T2, as well as a disconnect mechanism, denoted as S1. Accordingly, when the energy storage module 235 is inserted into the storage subsystem 15 and connects to the energy storage backplane 360 via a connector, the signal at the bottom of R6 (i.e., the base of T1) is effectively coupled to circuit ground on the energy storage backplane 360 through the connector. When the base of T1 is at ground potential it is not conducting. T2 is also not conducting, thus the discharging circuit is not active. However, if the energy storage module 235 is removed, the circuit ground is removed from the base of T1, which cause it to begin conducting. This also causes T2 to begin conducting, thereby discharging the voltage at node B and at node A to circuit ground. This type of active discharge may occur more quickly to prevent an accidental contact of high current to a user. For example, in one embodiment, the energy storage module 235 may be discharged in approximately 2 minutes, although in other embodiments, other discharge times may be used.

In another embodiment, management unit 205 may simply disable the 12V DC-DC converter 505. This will eventually discharge the supercapacitors through the leveling resistors R3 and R2. Lastly, in some embodiments, a discharge enable signal may be representatively applied through the discharge signal pin on the connector. For example, by removing the circuit ground on the energy storage backplane 360, the base of T1 may be pulled up to the potential at node B, which may actively discharge the supercapacitors SC1 and SC2 to circuit ground via the transistors T1 and T2.

During normal operation of the storage subsystem 15, the voltage at the node between supercapacitors SC1 and SC2 is monitored. In one embodiment, the Vmonitor unit 595A monitors the voltage to detect an overvoltage condition on either capacitor that is beyond a predetermined threshold. If the Vmonitor unit 595 detects such an overvoltage condition, it may de-assert the charge enable signal to disable the 12V DC-DC converter 505. In one implementation, the Vmonitor unit 595A may also monitor for an undervoltage condition at the node because an undervoltage at that node means there is likely an overvoltage on the other capacitor (e.g., SC1). Accordingly, if the Vmonitor unit 595A detects an undervoltage at the node that is below a predetermined threshold, Vmonitor 595A may de-assert the charge enable signal to disable the 12V DC-DC converter 505.

During a loss of AC power, or if both DC power supplies 275 fail, management unit 205 may assert a backup enable signal to the energy storage module 235. In one embodiment, the backup enable signal may cause controller 525 to control the gate voltages of the transistors T3, T4, and T5, thus regulating the output voltages of the capacitor banks in conjunction with the resistors R7, R8, and R9 down to approximately 3.3 VDC and effectively wire OR-ing the corresponding currents to provide the 3.3V backup voltage. In addition, the backup enable signal may allow controller 535 to control the gate voltage of transistor T6 to enable the 3.3V backup voltage output. It is noted that the diodes D3, D4, D5, and D6 that bridge across the source and drain of each of transistors T3, T4, T5, and T6, may prevent reverse current flow into the capacitor banks.

It is noted that although the above embodiments depict the energy storage modules providing backup power for the storage subsystem, it is contemplated that the energy storage modules may be used to provide backup power in any type of system that may require backup power.

Figure 6A:
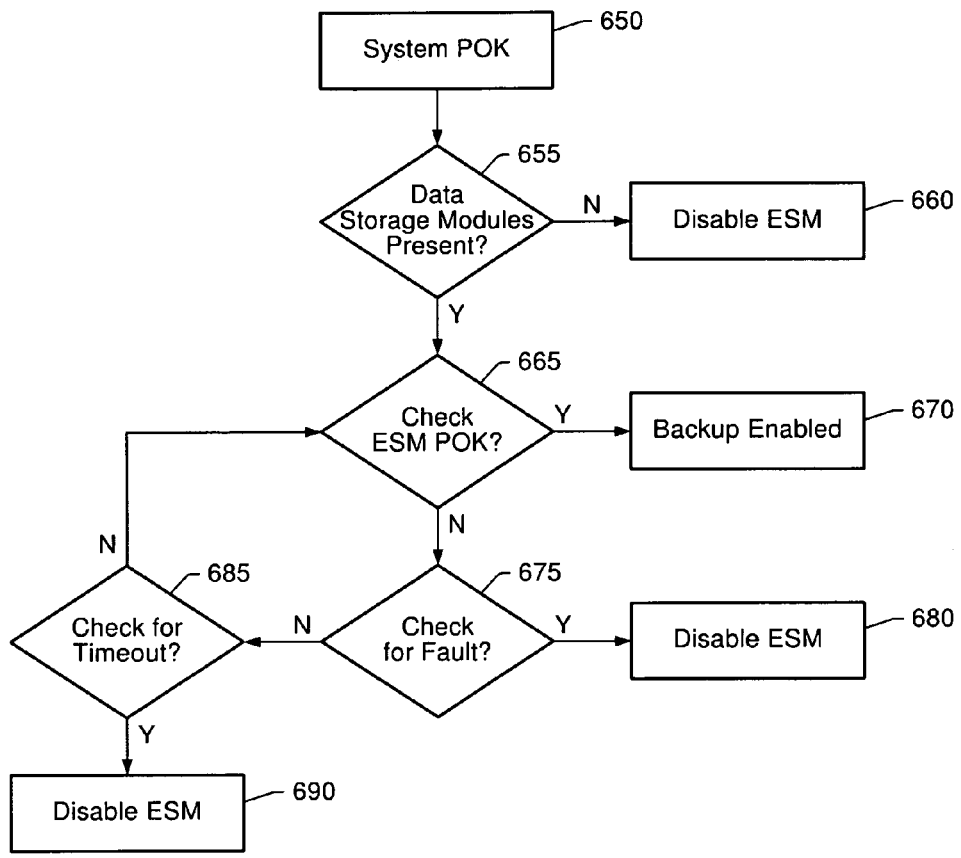
FIG. 6A is a flow diagram describing the operation of one embodiment of the storage subsystem during a power up sequence.

Turning to FIG. 6A, a flow diagram describing the operation of one embodiment of the storage subsystem during a power up and operation is shown. Referring collectively to FIG. 2, FIG. 5 and FIG. 6A and beginning in block 650 of FIG. 6A, once the storage subsystem 15 powers up, the management unit 205 controls power up of the energy storage module 235. More particularly, once the management unit 205 determines the system power up status is good (i.e., system POK status good), the management unit 205 checks the status of each energy storage module 235 in the system. As described above, in one embodiment, there are four energy storage modules 235, each one providing backup power for one domain (e.g., interface 210 and associated data storage modules 215). Accordingly, if the system power up is good, the management unit 205 checks to see that the data storage modules 215 assigned to each energy storage module 235 are present in the storage subsystem 15 (block 655). If the a given set of data storage modules 215 are not present, the management unit 205 may disable the energy storage module 235 associated with that given set of data storage modules 215 (block 660). For example, the management unit 205 may de-assert the chg enable signal to the DC-DC converter 505. If a given energy storage module 235 is not present, the management unit may notify the corresponding interface 210 which may alert the host so that cache flush operations may be performed inline.

However, if the data storage modules 215 are present (block 655), the management unit 205 may check the status of each energy storage module 235 during and after charging (block 665) by monitoring an energy storage module (ESM) power OK (ESM POK) signal, and/or a fault signal provided by each energy storage module 235. For example, in one embodiment the management unit 205 may allow each energy storage module 235 to begin charging by enabling the charging circuit within the energy storage modules 235, as long as no faults are present. The management unit 205 may then track the status and health of the energy storage modules 235 during the charging period. If the management unit 205 detects a fault (block 675), the management unit may disable the faulting energy storage module 235 (block 608). If there are no faults, but the charge period exceeds a predetermined time interval such as, for example, greater than 15 minutes (block 685), the management unit 205 may also disable the faulting energy storage module 235 (block 685).

Referring back to block 665, after the charging period is complete, the management unit 205 continues to monitor the energy storage modules 235. If the ESM POK signal is de-asserted or the ESM fault signal is asserted to indicate a fault at any time, the management unit 205 may disable the faulting energy storage module 235 as described above. In one embodiment, the management unit 205 may allow the supercapacitors to passively discharge by disabling the DC-DC converter 505 or actively discharge by removing the circuit ground from the discharge pin. In one embodiment, it may take over 5 minutes for a capacitor bank to passively discharge to 400 mV or less. However, as long as no fault conditions are present, the management unit 205 may continue to enable the energy storage modules 235 (block 670).

Figure 6B:
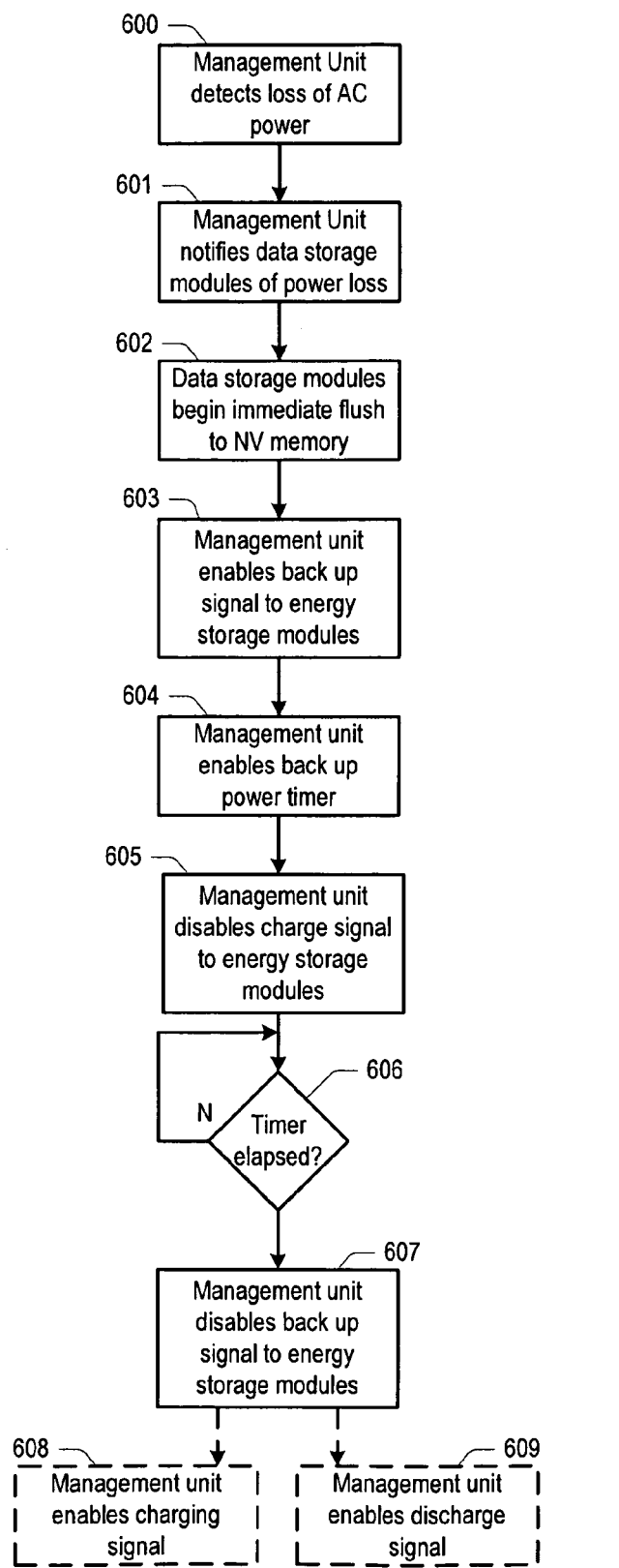
FIG. 6B is a flow diagram describing the operation of one embodiment of the storage subsystem during a power failure.

Turning to FIG. 6B, a flow diagram describing the operation of one embodiment of the storage subsystem during a power failure is shown. Referring collectively to FIG. 2, FIG. 5 and FIG. 6B and beginning in block 600 of FIG. 6B, as described above, system monitors 255 monitor the system and provide status information to management unit 205. When management unit detects an AC power failure, or both DC power supplies have failed, the management unit 205 notifies the data storage modules 215 by transitioning a backup signal (block 601). In one embodiment, management unit 205 may provide the backup signal to the data storage modules. However, in other embodiments, management unit 205 may notify the interface units 210, which may in turn notify the data storage modules 215.

In response to the transition of the backup signal, the data storage modules 215 may begin a data flush operation to flush any unwritten data from the volatile memory 310 to the non-volatile memory 301 (block 602). The management unit 205 may enable the backup enable signal to the energy storage modules 235, which may cause the power transistors (e.g., T3, T4, T5, and T6) of the energy storage modules 235 to conduct and allow the stored backup power to flow from the supercapacitors (block 603). The management unit 205 may start a backup power timer which may allow a predetermined amount of time for the energy storage modules 235 to provide backup power (block 604). In one embodiment, management unit may allow the energy storage modules 235 to provide backup power for 5 minutes, although other durations are possible and contemplated. The management unit 205 may also disable the charge signal to each DC-DC converter 505 to prevent the energy storage modules from trying to recharge during the backup power operation (block 605).

The energy storage modules 235 provide 3.3 VDC backup power as the timer counts. If the timer has elapsed (block 606), the management unit 205 may disable the backup signal to the energy storage modules, thereby turning off the power transistors and stopping the flow of stored energy to the data storage modules 215 (block 607).

In one embodiment, depending on the configuration of the management unit 205 and the system requirements, the management unit 205 may optionally (as denoted by the dashed lines) enable a discharge signal to the energy storage modules 235, so that the supercapacitors may continue to actively bleed off any remaining charge through the discharging circuit (block 608). Alternatively, the management unit 205 may enable each DC-DC converter 505 to allow the supercapacitors to begin charging when power is restored (block 609).

Figure 7A:
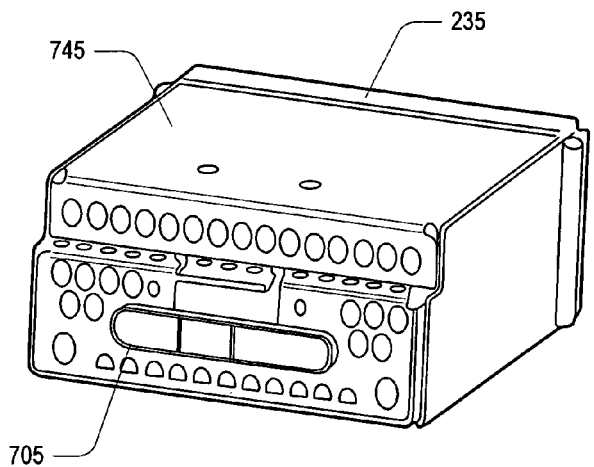
FIG. 7A is a perspective view diagram of one embodiment of the energy storage module shown in FIG. 3A.
Figure 7B:
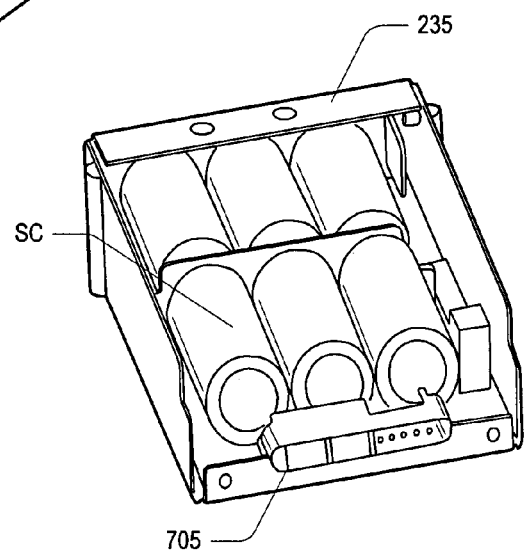
FIG. 7B is a perspective view diagram of the energy storage module of FIG. 6A with the cover in place.

FIGS. 7A and 7B are perspective view drawings of one embodiment of the energy storage module as shown in FIG. 2, FIG. 3A, FIG. 4B, and FIG. 5. Referring to FIG. 7A, the rear panel of the energy storage module 235 with the enclosure cover 745 in place is shown. The energy storage module 235 includes a special connector 705 that may detachably mate with a corresponding connector on the energy storage backplane 360 of FIG. 3A) within the storage subsystem enclosure. In one embodiment, the energy storage modules 235 are each hot pluggable in the event they need to be replaced while the system is in operation.

Referring to FIG. 7B, an energy storage module 235 with the enclosure cover 745 removed is shown. This illustration also shows the connector 705 and the supercapacitors (e.g., SC1-SC6).

Figure 7C:
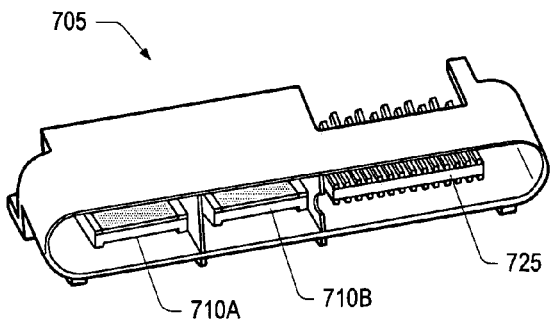
FIG. 7C is a perspective view diagram of one embodiment of a connector of the energy storage module shown in FIG. 7A and FIG. 7B.

Referring to FIG. 7C, a perspective view drawing of one embodiment of the connector of the energy storage module is shown. The non-metallic connector 705 includes sections 710A, 710B and 725. Each section is separated by a non-metallic separator. In one embodiment the connector body or housing may be plastic, or other non-metallic material. In one embodiment, sections 710A and 710B correspond to the 3.3V backup power and ground blades, respectively, while section 725 corresponds to the 12V supply, I/O and low voltage control signals. Table 1 below illustrates one embodiment of the pin configuration or "pinout" of the connector 705.

In the illustrated embodiment, the connector 705 provides 24 pins and four blades as shown in Table 1 below. Accordingly, section 725 includes pins A1 through A24. As shown in Table 1, pins A1-A3 and A13-A15 correspond to the 12 VDC supply voltage, while pins A4-A6 and A16-A18 correspond to the 12V supply circuit Ground pins. The 12 VDC power is provided by the power supplies 275 as described above. The 3.3V Aux pin (A7 and A19) provides the 3.3 VDC power from the power supplies 275 for system control functions to the energy storage modules 235. Pins A8-A10 provide ESM POK, ESM Fault, and ESM present indications from the energy storage module 235 to, for example, the energy storage backplane 360 and management unit 205. Pin A11 is the ESM backup Pwr En signal from the management unit 205, which enables the energy storage modules 235 to provide backup power. Pin A12 is the ESM discharged signal which is an output that indicates when the voltage on the supercapacitors is low enough such that the energy storage modules 235 may be considered discharged. Pin A20-A22 are LED signals from the energy storage backplane 360 to illuminate the respective LEDs on the energy storage modules when appropriate. Pin A23 is the energy storage module 12V charge enable signal, which enables and disables the 12V DC-DC converter 505, thus allowing the energy storage module to charge. Pin A24 is signal pin, which may be connected to circuit ground on the energy storage backplane 360, ad when the energy storage module 235 is inserted, the ground is connected to the binistor circuit as described above. Thus when the energy storage module 235 is removed, the ground is removed allowing the binistor circuit to discharge the energy storage module 235. Further, as described above, in one embodiment, the discharge signal pin may be coupled in such a way as to allow the management unit to force a discharge signal and cause the circuit ground to be removed, which allows the supercapacitors in the energy storage module 235 to discharge through the binistor.

Section 710A of FIG. 7C includes two 3.3V backup power blades that are labeled as blades C1 and C2 in Table 1, while section 710B of FIG. 7C includes two backup power circuit ground blades labeled as blades B1 and B2 in Table 1. It is noted the blade metal contact area is shaded in sections 710A and 710B of FIG. 7C As shown in FIG. 7C, the blades are arranged in a vertical manner, thus the 3.3V backup power and ground blades utilize the plastic separation in the connector itself to provide a level of isolation between the two. Additionally, the 3.3V backup power and ground blades are themselves recessed back from the front of the connector to provide further isolation and to reduce the risk of inadvertent contact. In addition, each section of the connector 705 includes a non-metallic protrusion having a top surface and a bottom surface. On the blade sections, the blade contact is formed along the top and bottom surfaces of the protrusion. The non-blade section 725, also includes a non-metallic protrusion with a top and bottom surface. For this section 725, the metallic contact pins are position in rows along the top and bottom surface and each contact pin alternates with a non-metallic section. In one embodiment, Pins A1-A12 correspond to the top surface pins and pins A13-A24 correspond to the bottom surface pins. Similarly, blade contacts B1 and C1 may be positioned on the top surfaces of their respective section protrusions, and blade contacts B2 and C2 may be positioned on the bottom surfaces of their respective section protrusions.

TABLE 1

Pinout of the energy storage module connector

| Pin Number | Signal Name | Pin Number | Signal Name |
|---|---|---|---|
| A1 | 12 V Power | A13 | 12 V Power |
| A2 | 12 V Power | A14 | 12 V Power |
| A3 | 12 V Power | A15 | 12 V Power |
| A4 | Ground | A16 | Ground |
| A5 | Ground | A17 | Ground |
| A6 | Ground | A18 | Ground |
| A7 | 3.3 V Aux | A19 | 3.3 V Aux |
| A8 | ESM POK L | A20 | POK Led L |
| A9 | ESM Fault L | A21 | Fault Led L |
| A10 | ESM Prsnt L | A22 | OK2RMV Led L |
| A11 | ESM BkUp Pwr En | A23 | ESM 12 V Chg En |
| A12 | ESM Discharged | A24 | ESM Discharge |
| B1 | Ground (Blade) | | |
| B2 | Ground (Blade) | | |
| C1 | 3.3 V Backup Power (Blade) | | |
| C2 | 3.3 V Backup Power (Blade) | | |

Thus, the above pinout and connector configuration may provide isolation between high current power pins and I/O signal pins over other connector configurations. In addition, the recessed power and ground blades of the high current backup power connector sections provides a measure of safety over other connectors. Further, the pin/signal locations on the connector may allow better routing of conductors within the connector for reduced inter-signal interference.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An energy storage module comprising:
one or more capacitor banks, each including one or more capacitors, wherein the one or more capacitors includes a first capacitor and a second capacitor connected in series for storing energy, wherein a first terminal of the first capacitor is coupled to a first terminal of the second capacitor at a node, and a second terminal of the first capacitor is coupled to a circuit ground node, and a second terminal of the second capacitor is coupled to a regulated direct current (DC) voltage through a first resistor;
a first voltage regulator coupled to the one or more capacitor banks and configured to, during a normal mode of operation, provide the regulated DC voltage to charge the one or more capacitors of each of the capacitor banks;
wherein each of the one or more capacitor banks includes a voltage leveling circuit coupled to the one or more capacitors and configured to maintain a specific voltage on each of the one or more capacitors, wherein the voltage leveling circuit includes:
a passive leveling portion having a first bleed resistor coupled between the node between the first and second capacitors and circuit ground, and a second bleed resistor coupled between the second terminal of the second capacitor and circuit ground; and
an active leveling portion including:
a second voltage regulator circuit coupled to the node between the first and second capacitors and configured to actively provide a first specific voltage to the node between the first and second capacitors; and
a third capacitor coupled in parallel with a control resistor between circuit ground and a control input of the second voltage regulator; and
an output circuit coupled to each of the one or more capacitor banks and configured to, during a backup mode of operation, provide an output voltage derived from an output of each of the one or more capacitor banks, wherein the output circuit includes a control unit configured to regulate and combine the output of each of the one or more capacitor banks.

2. The energy storage module as recited in claim 1, wherein each of the one or more capacitors comprises supercapacitors including a double-layer dielectric.

3. The energy storage module as recited in claim 1, wherein the second bleed resistor is configured to bleed off to circuit ground voltage that is in excess of a second specific voltage at the a second terminal of the second capacitor, and the first bleed resistor is configured to bleed off to circuit ground voltage that is in excess of the first specific voltage at the node between the first and second capacitors.

4. The energy storage module as recited in claim 1, wherein a capacitance value of the third capacitor is selected to control a slew rate and corresponding overshoot of the second voltage regulator such that the second voltage regulator operates sufficiently to maintain the first specific voltage at the first capacitor.

5. The energy storage module as recited in claim 4, wherein the capacitance value of the third capacitor is in a range of 300 microfarads (uf) to 400 uf.

6. The energy storage module as recited in claim 1, wherein each of the one or more capacitor banks includes a discharge circuit coupled in parallel with the first resistor, wherein the discharge circuit is configured to provide a discharge path from the output of each of the one or more capacitor banks to circuit ground in response to a connector of the energy storage module being disconnected from a mating connector.

7. The energy storage module as recited in claim 6, wherein the mating connector provides a path to circuit ground, and when the connector of the energy storage module is disconnected from the mating connector the circuit ground connection is broken, wherein the loss of circuit ground causes a transistor within the discharge circuit to conduct current from the output of each of the one or more capacitor banks to circuit ground.

8. The energy storage module as recited in claim 6, wherein the discharge circuit is further configured to provide a discharge path from output of each of the one or more capacitor banks to circuit ground in response to receiving a discharge enable signal.

9. A storage subsystem comprising:
a plurality of data storage modules, each including a non-volatile storage and a volatile storage; and
one or more backup power units, each configured to provide backup power to the plurality of data storage modules in response to a power loss to the storage subsystem, wherein each backup power unit includes:
one or more capacitor banks, each including one or more capacitors, wherein the one or more capacitors includes a first capacitor and a second capacitor connected in series for storing energy, wherein a first terminal of the first capacitor is coupled to a first terminal of the second capacitor at a node, and a second terminal of the first capacitor is coupled to a circuit ground node, and a second terminal of the second capacitor is coupled to a regulated direct current (DC) voltage through a first resistor;
a first voltage regulator coupled to the one or more capacitor banks and configured to, during a normal mode of operation, provide the regulated DC voltage to charge the one or more capacitors of each of the capacitor banks;
wherein each of the one or more capacitor banks includes a voltage leveling circuit coupled to the one or more capacitors and configured to maintain a specific voltage on each of the one or more capacitors, wherein the voltage leveling circuit includes:
a passive leveling portion having a first bleed resistor coupled between the node between the first and second capacitors and circuit ground, and a second bleed resistor coupled between the second terminal of the second capacitor and circuit ground; and
an active leveling portion including:
a second voltage regulator circuit coupled to the node between the first and second capacitors and configured to actively provide a first specific voltage to the node between the first and second capacitors; and
a third capacitor coupled in parallel with a control resistor between circuit ground and a control input of the second voltage regulator; and an output circuit coupled to each of the one or more capacitor banks and configured to, during a backup mode of operation, provide an output voltage derived from an output of each of the one or more capacitor banks, wherein the output circuit includes a control unit configured to regulate and combine the output of each of the one or more capacitor banks.

10. The storage subsystem as recited in claim 9, further comprising a management unit coupled to the one or more backup power units and to the plurality of data storage modules and configured to monitor and manage system information including environmental and system status information, wherein in response to a loss of power to the storage subsystem, the management unit is configured to provide a backup signal indicating that a loss of power has occurred, and in response to the backup signal, the one or more backup power units is configured to provide the backup power to each of the plurality of data storage modules, and each of the plurality of data storage modules is configured to write unwritten data stored within the volatile storage to the non-volatile storage.

11. The storage subsystem as recited in claim 9, wherein each of the one or more capacitors comprises supercapacitors including a double-layer dielectric.

12. The storage subsystem as recited in claim 9, wherein the second bleed resistor is configured to bleed off to circuit ground voltage that is in excess of a second specific voltage at the a second terminal of the second capacitor, and the first bleed resistor is configured to bleed off to circuit ground voltage that is in excess of the first specific voltage at the node between the first and second capacitors.

13. The storage subsystem as recited in claim 9, wherein a capacitance value of the third capacitor is selected to control a slew rate and corresponding overshoot of the second voltage regulator such that the second voltage regulator sufficiently operates to maintain the first specific voltage at the first capacitor.

14. The storage subsystem as recited in claim 13, wherein the capacitance value of the third capacitor is in a range of 300 microfarads (uf) to 400 uf.

15. The storage subsystem as recited in claim 9, wherein each of the one or more capacitor banks includes a discharge circuit coupled in parallel with the first resistor, wherein the discharge circuit is configured to provide a discharge path from the output of each of the one or more capacitor banks to circuit ground in response to either of a connector of the energy storage module being disconnected from a mating connector or in response to receiving a discharge enable signal.

16. A system comprising:
an electronic device;
a primary power supply configured to provide power to the electronic device during a normal operational mode; and
a backup power unit configured to provide backup power to the electronic device in response to power loss to the system, wherein the backup power unit includes:
one or more capacitor banks, each including one or more capacitors, wherein the one or more capacitors includes a first capacitor and a second capacitor connected in series for storing energy, wherein a first terminal of the first capacitor is coupled to a first terminal of the second capacitor at a node, and a second terminal of the first capacitor is coupled to a circuit ground node, and a second terminal of the second capacitor is coupled to a regulated direct current (DC) voltage through a first resistor;
a first voltage regulator coupled to the one or more capacitor banks and configured to, during a normal mode of operation, provide the regulated DC voltage to charge the one or more capacitors of each of the capacitor banks;
wherein each of the one or more capacitor banks includes a voltage leveling circuit coupled to the one or more capacitors and configured to maintain a specific voltage on each of the one or more capacitors, wherein the voltage leveling circuit includes:
a passive leveling portion having a first bleed resistor coupled between the node between the first and second capacitors and circuit ground, and a second bleed resistor coupled between the second terminal of the second capacitor and circuit ground; and
an active leveling portion including:
a second voltage regulator circuit coupled to the node between the first and second capacitors and configured to actively provide a first specific voltage to the node between the first and second capacitors; and
a third capacitor coupled in parallel with a control resistor between circuit ground and a control input of the second voltage regulator; and
an output circuit coupled to each of the one or more capacitor banks and configured to, during a backup mode of operation, provide an output voltage derived from an output of each of the one or more capacitor banks, wherein the output circuit includes a control unit configured to regulate and combine the output of each of the one or more capacitor banks.

* * * * *